United States Patent [19]

Harris

[11] Patent Number: 4,787,529
[45] Date of Patent: Nov. 29, 1988

[54] VAPOR-LIQUID CONTROL FUEL CAP

[75] Inventor: Robert S. Harris, Connersville, Ind.

[73] Assignee: Stant Inc., Connersville, Ind.

[21] Appl. No.: 62,852

[22] Filed: Jun. 16, 1987

[51] Int. Cl.$^4$ ............................................. B65D 51/16
[52] U.S. Cl. .................................. 220/203; 220/303;
220/204; 220/DIG. 33; 137/43
[58] Field of Search ............... 220/203, 204, 303, 288,
220/DIG. 33; 137/43, 493.6, 512.1, 512.2,
512.3, 533.15

[56] References Cited
U.S. PATENT DOCUMENTS

| | | |
|---|---|---|
| 1,893,942 | 1/1933 | Jensen. |
| 4,000,828 | 1/1977 | Crute et al. ......................... 220/203 |
| 4,162,021 | 7/1979 | Crute .................................. 220/203 |
| 4,685,584 | 8/1987 | Harris ................................. 220/204 |

Primary Examiner—George T. Hall
Attorney, Agent, or Firm—Barnes and Thornburg

[57] ABSTRACT

A fuel cap for use in a vehicle fuel system filler neck is provided. The fuel cap includes a closure for closing the filler neck and a pressure relief valve that is movable between a filler neck-venting position and a non-venting position. A roll-over control assembly is provided for selectively utilizing liquid fuel and fuel vapor in the filler neck to exert a closing force on the pressure relief valve so that the pressure relief valve is moved to its non-venting position to block discharge of liquid fuel to the atmosphere through the pressure relief valve during vehicle rollover. The roll-over control assembly cooperates with the pressure relief valve to define a venting control chamber for containing fuel and a fuel vapor in a predetermined region to permit the fuel and fuel vapor to exert the closing force on the pressure relief valve. A passageway is provided for establishing communication of fuel and fuel vapor in the filler neck with the venting control chamber. The roll-over control assembly also includes a valve in the passageway for blocking the flow of fuel and fuel vapor through the passageway until the force exerted by the fuel and fuel vapor in the filler neck upon the valve exceeds a predetermined threshold force during vehicle rollover or the like.

25 Claims, 2 Drawing Sheets

VAPOR-LIQUID CONTROL FUEL CAP

BACKGROUND AND SUMMARY OF THE INVENTION

The present invention relates to fuel caps for closing filler necks of vehicle fuel tanks. More particularly, the present invention relates to a fuel cap that includes a controllable pressure-relief valve that permits venting of the tank under normal conditions, and also controls fuel leakage from the cap during a roll-over condition.

Conventional fuel caps for closing the filler neck of vehicle fuel tanks generally include a pressure-vacuum valve located in the cap to control the pressure within the fuel tank. Whenever the pressure within the tank reaches a first, predetermined superatmospheric level, the pressure valve portion of the pressure-vacuum valve automatically opens to prevent excess pressure build up within the tank. Whenever the pressure within the tank drops to a predetermined subatmospheric level, the vacuum valve portion of the pressure-vacuum valve opens to equalize the pressure in the tank.

In addition, conventional fuel caps having pressure-vacuum valves may include a roll-over valve disposed on the fuel tank side of the pressure-vacuum valve to isolate the pressure-vacuum valve from fuel and fuel vapor when the vehicle is rolled to a substantially inverted orientation. By isolating the pressure-vacuum valve from fuel and vapor pressure when the cap is in a substantially inverted orientation, the fluid head created by the fuel and the vapor pressure are not permitted to force the pressure valve open which would cause undesired fuel leakage from the cap in the inverted orientation. By isolating the pressure-vacuum valve from the fuel and fuel vapor, the venting capacity of such a conventional fuel cap is eliminated when in the inverted orientation. Although it is normally desirable to prevent fuel leakage from the cap in this orientation, it is sometimes desirable to permit limited fuel leakage from the cap when in the inverted orientation to prevent excessive pressure buildup within the tank.

To permit some fuel leakage from the cap when in the inverted orientation, some conventional fuel caps have included an additional valve member in the cap which opens when the pressure within the tank reaches a second, superatmospheric level, higher than the first superatmospheric level. In such conventional caps, because the normal pressure-vacuum valve has been isolated from the fuel and fuel vapor, the additional pressure valve for venting the excessive pressure within the tank must be a separate valve from the normal pressure-vacuum valve. One problem with this solution to the venting of excess pressure from the tank is that, because an additional venting valve is required, the cap is more complex and more costly to produce.

One object of the present invention is to provide a vented fuel cap with a pressure valve that vents the tank under normal conditions when the pressure within the tank reaches a first, predetermined superatmospheric level and that prevents fuel leakage from the tank when the cap is in a substantially inverted orientation without the use of a roll-over valve that isolates the pressure valve from the fuel and fuel pressure.

Another object of the present invention is to provide a fuel cap having a pressure valve that permits limited fuel leakage from the cap when the cap is in an inverted orientation to prevent excessive buildup of pressure within the tank without the addition of an additional vapor release valve in the cap.

Yet another object of the present invention is to provide a fuel cap with a pressure valve that is always in fluid communication with the fuel tank, and whose operation is selectively controllable so that venting through the pressure valve is permitted whenever pressure within the tank reaches a first, predetermined superatmospheric level when the cap is in a normal orientation, and which prevents fuel leakage from the cap when the cap is in an inverted orientation, and further permits limited fuel leakage from the cap when excessive pressure exists within the tank when in the inverted orientation.

According to the present invention, a fuel cap for use in a vehicle fuel system filler neck is provided. The fuel cap includes closure means for closing the filler neck and pressure relief means for venting fuel vapor in the filler neck through the closure means. The pressure relief means includes a pressure relief valve that is movable between a filler neck-venting position and a non-venting position. Roll-over control means are provided for selectively utilizing liquid fuel and fuel vapor in the filler neck to exert a closing force on the pressure relief valve so that the pressure relief valve is moved to its non-venting position to block discharge of liquid fuel to the atmosphere through the pressure relief means during vehicle rollover.

One feature of the foregoing structure is that roll-over control means are provided for selectively utilizing fuel and fuel vapor to exert a closing force on the pressure relief valve to position the pressure relief valve in the non-venting position during vehicle roll over. One advantage of this feature is that, by utilizing fuel and fuel vapor to control the pressure relief valve, the necessity of a separate roll-over valve to isolate the pressure relief valve from the fuel and fuel vapor is eliminated.

Another feature of the foregoing structure is that fuel and fuel vapor are utilized to selectively control the position of the pressure relief valve. One advantage of this feature is that the medium that is to be controlled, that is the fuel and fuel vapor, dictates and controls the operation of the pressure relief valve. One advantage of this feature is that a single pressure relief valve can be used to control all of the venting activity of the cap.

In preferred embodiments of the present invention, the roll-over control means cooperates with the pressure relief valve to define venting control chamber means for containing fuel and fuel vapor in a predetermined region to permit the fuel and fuel vapor to exert the closing force on the pressure relief valve.

In other preferred embodiments, the roll-over control means further includes passageway means for establishing communication of fuel and fuel vapor in the filler neck with the venting control chamber means. The roll-over control means also includes valve means in the passageway means for blocking the flow of fuel and fuel vapor through the passageway means until the force exerted by the fuel and fuel vapor in the filler neck upon the valve means exceeds a predetermined threshold force during vehicle rollover or the like.

One feature of the foregoing structure is that the venting control chamber means, the passageway means, and the valve means cooperate to utilize the fuel and fuel vapor to exert a control force on the pressure relief valve to control the positioning of that valve. One advantage of this feature is that the pressure relief valve is always in communication with the fuel or fuel vapor, and is the sole mechanism for controlling venting of the cap.

In other preferred embodiments, the venting control chamber means includes safety valve means for exhausting fuel and fuel vapor in excess of a predetermined maximum pressure from the predetermined region so that fuel and fuel vapor in the predetermined region dissipates to lower the pressure in the region to a magnitude less than a minimum pressure magnitude, thereby permitting the pressure relief valve to move to its venting position.

One feature of the foregoing structure is that safety valve means are provided for dissipating the fuel and fuel vapor in the predetermined region to permit the pressure relief valve to move to its venting position. One advantage of this feature is that, should the pressure due to fuel and fuel vapor in the tank exceed a predetermined maximum pressure, the safety valve means functions to dissipate a portion of the fuel and fuel vapor in the predetermined region which is acting to position the pressure relief valve in its non-venting position. By dissipating a portion of this positioning pressure, the pressure relief valve is permitted to move to its venting position to enable a portion of the pressure within the tank to vent to the atmosphere.

Thus, the fuel cap of the present invention is able to control the venting from the cap under normal conditions, and under abnormal conditions such as vehicle roll over. The pressure relief valve in the cap is controlled by a venting control chamber which is in fluid communication with fuel and fuel vapor in the filler neck. The fuel and fuel vapor in the venting control chamber acts to position the pressure relief valve in its non-venting position when the cap is in an inverted orientation and when the combined fluid head created by the fuel in the tank and the fuel vapor is less than a predetermined maximum pressure. When the combined fuel head and fuel vapor pressure exceed this predetermined maximum pressure with the cap in an inverted orientation, the safety valve means acts to dissipate the pressure within the venting control chamber which permits the pressure relief valve to move to its venting position. By permitting the pressure relief valve to move to its venting position under these conditions, the excessive pressure within the tank is enabled to vent to the atmosphere.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

A vented fuel cap 10 for closing a filler neck 12 of a vehicle (not shown) is illustrated in FIGS. 1-4. A control system within the cap controls a pressure relief valve to control venting of fuel vapor from the cap when the cap is in a normal orientation, and controls release of fuel vapor and fuel from the cap when the cap is in a substantially inverted orientation, such as when the vehicle is subjected to a roll-over condition.

Figures 1, 2, 3:
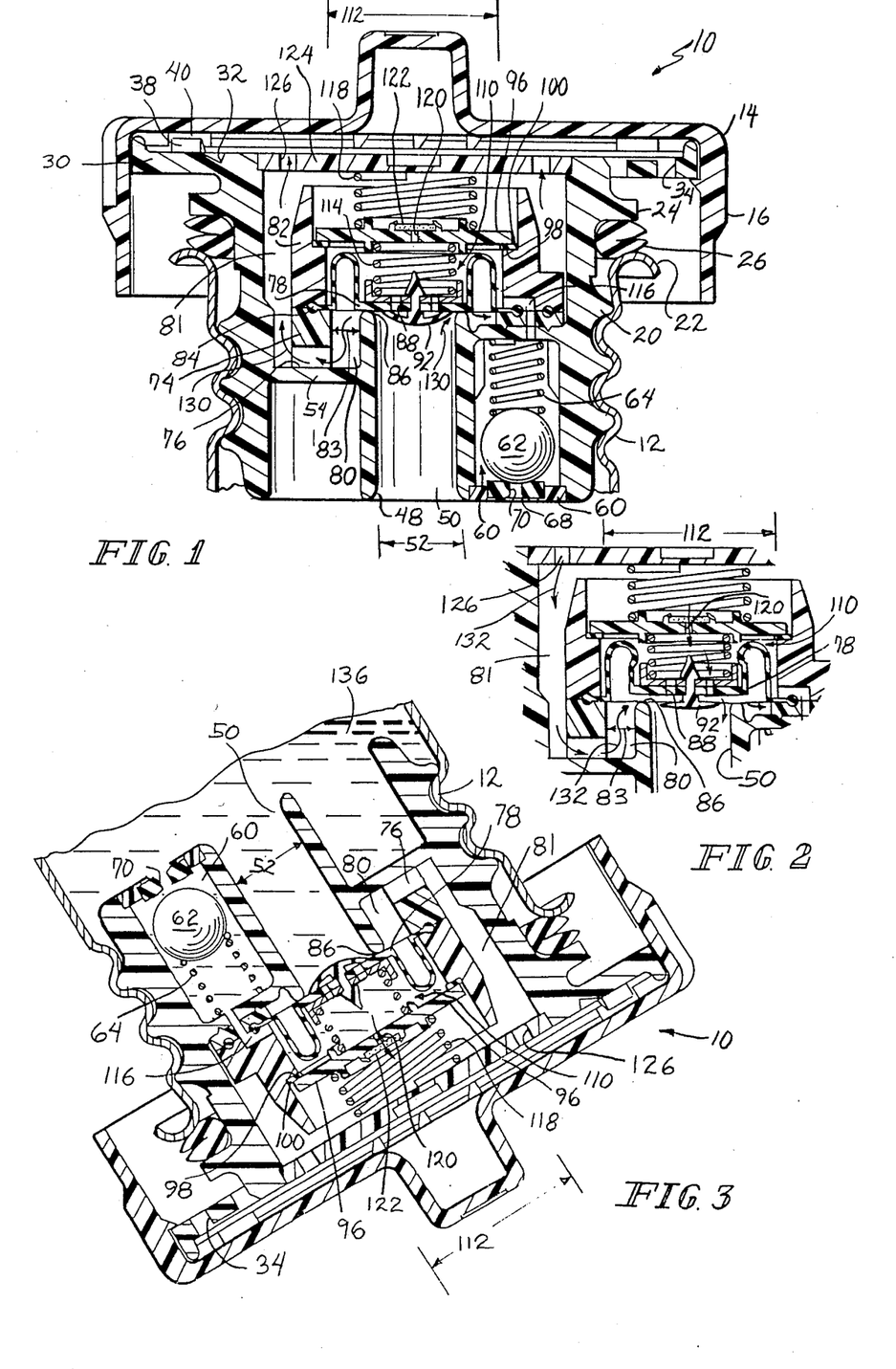
FIG. 1 is a transverse sectional view through the fuel cap of the present invention.
FIG. 2 is an isolated partial sectional view showing an enhanced vacuum equalization feature of the cap.
FIG. 3 is a view similar to FIG. 1 with the cap in a substantially inverted orientation with fuel and fuel vapor present in the venting control chamber.

FIG. 1 shows the fuel cap 10 of the present invention in a normal orientation. The cap 10 is shown in place to seal a filler neck 12 of a vehicle (not shown) The cap 10 includes an outer shell 14 that serves as a handle to assist the operator in removing and replacing the cap 10. The shell 14 includes a peripheral, axially downwardly extending shroud 16 that extends completely around the cap 10.

The cap 10 includes an inner closure member 20 which is configured to threadingly engage and seal the filler neck 12. The filler neck 12 includes a radially outwardly turned lip 22 at its axially upper end. The closure member 20 includes a radially outwardly extending sealing flange 24. A gasket 26 is captured between the lip 22 and the sealing flange 24 to sealingly engage the closure member 20 to the filler neck 12.

A radially outwardly extending flange 30 is disposed at the axially upper end of the closure 20 and is configured to carry the shell 14. A groove 32 is formed in the upper surface of the flange 30, with the groove advantageously providing breakaway characteristics for the flange 30 and shell 14. For a description of the use and configuration of the groove 32 to provide breakaway characteristics, referral is made to U.S. application Ser. No. 883,563 filed July 9, 1986 to Crute for a Breakaway Gas Cap which will issue as U.S. Pat. No. 4,678,097 on July 7, 1987, which is hereby incorporated by reference. A series of spaced-apart openings 34 are formed in the flange 30, the use of which will be discussed later.

To provide a driving connection between the shell 14 and the closure member 20, pawl teeth 38 (only one of which is shown in FIG. 1) are provided on the upper surface of the flange 30. The pawl teeth 38 cooperate with notches 40 formed on the underneath side of the shell 14 to provide a torque-override connection between the shell 14 and the closure member 20. Specifically, the pawl teeth 38 and notches 40 cooperate to provide a torque-override driving connection in the cap-advancing direction to prevent overtightening of the closure member 20 within the filler neck 12. In the cap-removal direction, the Pawl teeth 38 and notches 40 cooperate to provide a direct-drive connection to remove the cap 10 from the filler neck 12. A preferred embodiment of this torque override connection is more fully illustrated in U.S. Pat. No. 4,083,209 which is hereby incorporated by reference.

An upstanding cylindrical wall 48 is disposed within the closure member 20 to define a vapor discharge orifice 50. The vapor discharge orifice 50 provides fluid communication between the fuel tank (not shown) and the closure member 20. The vapor discharge orifice 50 has a diameter indicated by the dimension 52. A support member 54 is provided to position and stabilize the discharge orifice 50 within the closure member 20.

A cavity 60 is formed adjacent the discharge orifice 50 between the discharge orifice 50 and a portion of an outer wall of the closure member 20. The cavity 60 forms a cylindrical cage which houses a ball 62 that is controlled by a control spring 64. The bottom opening of the cavity 60 is covered by a plate 66 in which a gasket 68 is disposed. The gasket 68 has an opening 70 formed therethrough which forms a valve seat for the ball 62. The control spring 64 is mounted above the ball 62 such that the ball 62 is normally urged axially downwardly to seal the valve seat or opening 70. The opening 70 is the only opening between the fuel tank (not shown) and the interior of the cavity 60, therefore with the ball 62 seated on the opening 70, the cavity 60 is placed out of fluid communication with the fuel tank.

A diaphragm seat member 74 is disposed above the support member 54 and includes one or more openings 76. The openings 76 acts to permit fluid communication between an inner space 80 that is disposed radially inwardly from the diaphragm seat member 74 and an outer space 81 that is disposed radially outwardly of the diaphragm seat member 74, between the diaphragm seat member 74 and the wall of the closure member 20.

A diaphragm valve or pressure relief valve 78 is mounted on the diaphragm seat member 74 and extends across the upper end of the cylindrical wall 48 forming the discharge orifice 50. A bead 84 that extends circumferentially around the Pressure relief valve 78 is captured between the diaphragm seat member 74 and a retainer housing 82 such that the pressure relief valve 78 is restrained from any radial movement with respect to the diaphragm seat member 74 and retaining housing 82. Because of its configuration, and its mounting orientation, the pressure relief valve 78 is only permitted to move axially toward and away from the upper end of the discharge orifice 50, and specifically toward or away from a ledge or valve seat 86 that is formed peripherally around the axial upper end of the discharge orifice 50.

With the pressure relief valve 78 seated on the valve seat 86, the discharge orifice 50 is placed out of fluid communication with the inner space 80. When the pressure relief valve 78 is moved axially upwardly away from the valve seat 86, the discharge orifice 50 is placed in fluid communication with the inner space 80, and through the opening 76 with the outer space 81. A series of holes 88 is formed in the surface of the pressure relief valve 78 which are normally covered by an umbrella valve 92. The umbrella valve 92 functions as a vacuum valve and is movable between a closed position where the holes 88 are out of fluid communication with the discharge orifice 50, to an open position where the holes 88 are in fluid communication with the discharge orifice 50. The function of the umbrella valve 92 and the holes 88 will be discussed later.

A venting control valve 96 is disposed above the level of the pressure relief valve 78 and rests on a shoulder 98 that is formed around the inner surface of the retaining housing 82. A gasket 100 is disposed on the shoulder 98 between the shoulder 98 and the venting control valve 96 to form a positive seal between the venting control valve 96 and the shoulder 98. It will be understood that the shoulder 98 forms a valve seat against which the venting control valve 96 normally rests.

The space created above the pressure relief valve 78 and below the venting control valve 96 and bounded by the inner surface of the retaining housing 82 defines a venting control chamber 110. The venting control chamber 110 has a diameter indicated by the dimension 112 which, as can be seen in FIG. 1, is larger than the dimension 52 which is the diameter of the discharge orifice 50. Comparing the dimension 112 to the dimension 52, it can be seen that these two dimensions define areas to which force may be exerted on opposite sides of the pressure relief valve 78. Specifically, the dimension 112 defines an area in which force may be exerted on the axially upper surface of the pressure relief valve 78. The dimension 52 defines an area on which force may be exerted on the axially lower surface of the pressure relief valve 78. The relationship between the different force areas to control the movement of the pressure relief valve 78 will be discussed later.

A spring 114 is disposed within the venting control chamber 110 and functions to bias the pressure relief valve 78 into contact with the valve seat 86. The upper portion of the spring 114 is in contact with the venting control valve 96. Thus, it will be understood that movement of the venting control valve 96 axially upwardly away from the shoulder 98 affects the biasing force exerted by the spring 114 on the pressure relief valve 78. Specifically, axially upward movement of the venting control valve 96 will decrease somewhat the biasing force exerted by the spring 114 on the pressure relief valve 78 toward the valve seat 86. It will be understood that the pressure relief valve 78 and the spring 114 cooperate to define pressure relief means that are used to control pressure created by fuel and fuel vapor within the fuel tank (not shown).

A passageway 116 is provided to permit fluid communication between the venting control chamber 110 and the cavity 60. As stated previously, the cavity 60 is selectively placed in fluid communication with the fuel tank (not shown) through the opening or valve seat 70. The fluid communication between the fuel tank and the cavity 60 is controlled by the ball 62 and spring 64, the use of which will be discussed later.

A spring 118 is provided above the venting control valve 96 and acts to bias the venting control valve axially downwardly against the shoulder 98 to seal the venting control chamber 110. As can be seen in FIG. 1, the spring 118 is somewhat larger than the spring 114, and exerts a somewhat greater force downwardly against the venting control valve 96 than the force exerted by the spring 114 against the pressure relief valve 78. An orifice 120 is formed in the center of the venting control valve 96, with the orifice 120 providing fluid communication between the outer space 81 within the closure member 20 and the venting control chamber 110. A discriminating membrane 122 is disposed over the orifice 120, with the discriminating membrane selected from a variety of known materials such that the membrane 122 permits fuel vapor and air to flow through the orifice 120, but prevents liquid fuel from flowing through the orifice 120. An upper plate 124 is provided to close the outer space 81 and to provide an upper surface against which the spring 118 rests. A series of vent holes 126 are provided in the plate 124 to permit venting communication between the outer space 81 within the closure member 20 and the atmosphere through the holes 34 in the flange 30.

As stated previously, the venting control chamber 110 has a dimension 112 which defines an area on which a force may be exerted on the axially upper side of the pressure relief valve 78. The force exerted on the pressure relief valve 78 from the venting control chamber 110 is created by pressure from fuel vapor and in some instances from fuel creating a head pressure to exert a force on the pressure relief valve 78 toward the valve seat 86. It will be understood that the combined liquid head and pressure within the venting control chamber 110 acts over the area defined by the dimension 112 to create the axially downwardly directed force on the pressure relief valve 78. Likewise, pressure from fuel vapor and in some instances fuel creates a force on the lower or fuel tank side of the pressure relief valve 78 through the discharge orifice 50. The pressure from the fuel vapor and in some instance from a liquid head created by fuel act on the area defined by the dimension 52 to create a force on the pressure relief valve 78 which acts to move the pressure relief valve 78 axially upwardly away from the valve seat 86. Thus, at certain times in the operation of the cap, differing forces may be acting on both sides of the pressure relief valve 78, dictated by differing pressures and pressure exerting areas of different sizes on both sides of the pressure relief valve 78. These differing forces, as well as the biasing force of the spring 114 act to control the movement of the pressure relief valve 78 to control venting of the cap 10.

The pressure within the venting control chamber 110 created by fuel vapor and at times liquid head pressure is controlled by the action of the ball 62 within the cavity 60. When the ball 62 is unseated from the opening 70, pressure and at times fuel within the cavity 60 is transmitted to the venting control chamber 110 through the passageway 116. As will be discussed later, this unseating of the ball 62 occurs only during a roll-over condition, therefore the ball 62 and control spring 64 combine to create roll-over valve means or sensing means to primarily control the pressure within the venting control chamber 110. In addition, as stated previously, the orifice 120 permits a limited amount of fluid communication between the venting control chamber 110 and the atmosphere through the vent holes 126 and openings 34. Thus, the roll-over valve means or sensing means, that is the ball 62 and control spring 60, function as the primary control of pressure within the venting control chamber 110 through the passageway 116. The orifice 120 acts as a secondary control to control pressure within the venting control chamber 110.

As can be seen in FIG. 1, the pressure within the discharge orifice 50 is directly controlled by fuel and fuel vapor within the fuel tank (not shown) because the discharge orifice 50 is in direct communication with the fuel tank. Thus, depending upon the conditions within the fuel tank and the orientation of the cap 10, differing pressures may exist within the venting control chamber 110 with respect to the discharge orifice 50. These pressures, acting through the differently sized areas defined by the dimensions 112 and 52, thus may create different opposing forces on the pressure relief valve 78. These opposing forces act to control the position of the pressure relief valve 78 with respect to the valve seat 86 to control venting of the fuel cap 10. The different conditions within the fuel tank, and the different orientations of the cap, will be discussed below in the discussions related to FIGS. 2–5.

In use, and continuing to refer to FIG. 1, when conditions within the fuel tank are normal, and the configuration of the fuel cap is generally upright, the elements of the cap 10 will be in the positions shown in FIG. 1. That is, when the pressure within the tank created by fuel vapor is below a first predetermined superatmospheric level, and above a first predetermined subatmospheric level, and the vehicle and fuel cap 10 are upright, the cap 10 will function as a normal fuel cap to seal the filler neck 12. Under these conditions, the ball 62, due to its weight and the biasing force of the spring 64, is seated on the valve seat or opening 70 to eliminate fluid communication between the fuel tank and the cavity 60. The pressure within the venting control chamber 110 will be atmospheric pressure under these conditions because of the fluid communication between the venting control chamber 110 and atmosphere through the orifice 120. In addition, the pressure within the inner space 80 which acts on the outer portion of the pressure relief valve 78 through an area defined by the dimension 83 will be atmospheric as well. The pressure within the discharge orifice 50 will be dictated by the pressure within the fuel tank (not shown). Under these circumstances, the pressure relief valve 78 is biased by the spring 114 onto the valve seat 86, and no venting takes place from the fuel cap 10. This is the desired venting relationship under these conditions, and is considered normal.

Should the pressure within the fuel tank rise due to increasing fuel vapor pressure, the pressure within the discharge orifice 50 will increase somewhat, with the pressure acting on the area defined by the dimension 52 to create a force on the pressure relief valve 78 away from the valve seat 86. At this time, the pressure within the venting control chamber 110 will still be atmospheric pressure. Should the pressure within the fuel tank increase to a first, predetermined superatmospheric level, the force exerted on the pressure relief valve 78 in the discharge orifice 50 will be sufficient to overcome the biasing force of the spring 114, as well as any force exerted axially downwardly by atmospheric pressure within the venting control chamber 110, and the pressure relief valve 78 will move axially upwardly away from the valve seat 86 to permit fuel vapor to vent from the fuel tank. This normal venting of pressure from the fuel tank is indicated by the arrows 130. Although FIG. 1 does not show the pressure relief valve 78 in a position away from the valve seat 86, it will be understood that the arrows 130 are shown to indicate the movement of pressure from the fuel tank through the discharge orifice 50 and that the pressure relief valve 78 would be displaced somewhat from the valve seat 86 to permit this flow.

When the pressure within the fuel tank falls below the first, predetermined superatmospheric level, the force exerted on the pressure relief valve 78 through the discharge orifice 50 decreases and the spring 114 acts to urge the pressure relief valve 78 onto the valve seat 86 to discontinue venting from the fuel tank. It will be understood that when the pressure in the tank reaches the first, predetermined superatmospheric level, this pressure is not sufficient to displace the ball 62 from the valve seat 70. Therefore, when the cap 10 is upright and normal venting is occurring, the cavity 60 is not in fluid communication with the fuel tank.

Referring to FIG. 2, FIG. 2 illustrates the fuel cap 10 in a normal, upright orientation, with the pressure in the fuel tank falling below a first, predetermined subatmospheric level. Specifically, when the pressure within the fuel tank falls below the first, predetermined subatmospheric level, the umbrella valve 92 first opens to permit atmospheric pressure air from the venting control chamber 110 to enter the discharge orifice 50 and fuel tank through the holes 88 to partially relieve the lower than normal pressure in the fuel tank. Because of the limited size of the orifice 120, and the relative larger size and number of the holes 88, the supply of air within the venting control chamber 110 will be depleted through the holes 88 before the air can be replaced through the orifice 120. Therefore, the pressure within the venting control chamber 110 will decrease as the air within the venting control chamber 110 is drawn into the fuel tank through the holes 88 and discharge orifice 50.

Because the pressure within the venting control chamber 110 decreases, the force exerted downwardly on the pressure relief valve 78 over the area defined by the dimension 112 within the venting control chamber 110 also decreases. At the same time, the pressure within the inner space 80 is atmospheric pressure because of the fluid communication between the inner space 80, the outer space 81, and the vent holes 126. Thus, the force exerted axially upwardly on the outer portion of the pressure relief valve 78 created by atmospheric pressure acting on the area defined by the dimension 83 becomes greater than the force exerted downwardly on the pressure relief valve 78 from the venting control chamber 110. These differing forces cause the pressure relief valve 78 to move axially upwardly away from the valve seat 86. This permits venting communication directly between the discharge orifice 50 and the atmosphere through the inner space 80, the outer space 81, and the vent holes 126. This causes a flow of air into the fuel tank along this route as indicated by the arrows 132. This positioning of the pressure relief valve 78 thus acts to further equalize the pressure within the fuel tank to normalize the lower than normal pressure in the tank. Thus, in this configuration, the pressure relief valve 78 has been controlled to move away from the valve seat 86 and to act as an addition vacuum relief valve under these specified conditions. This is advantageous because the lower than normal Pressure within the tank can be quickly equalized.

FIG. 3 shows the cap 10 in a roll-over orientation such as may be caused by an accident in which the vehicle (not shown) is turned over. The fuel 136 in the fuel tank will flow by gravity through the filler neck 12 to be in contact with the cap 10. In this orientation, the fuel 136 creates a fluid head pressure on the components of the cap 10 that combines with any vapor pressure existing within the tank to create a total pressure on the cap 10 equal to a second predetermined superatmospheric pressure higher than the first superatmospheric pressure. Under these conditions, a force is exerted on the fuel tank side of the pressure relief valve 78 due to this pressure acting on the area defined by the dimension 52 within the discharge orifice 50. It will be understood that, without means for controlling the pressure relief valve 78, this force exerted on the pressure relief valve 78 due to the fluid head and vapor pressure would urge the pressure relief valve 78 away from the valve seat 86 and would cause the fuel 136 to leak from the cap 10 through the opening 76 and vent holes 126 and openings 34. Because fuel leakage under these circumstances is undesirable, means are provided to control the movement of the pressure relief valve to resist the repositioning of the pressure relief valve 78 away from the valve seat 86. Specifically, roll-over control means are provided to compensate for the force exerted on the fuel tank side of the pressure relief valve 78 through the discharge orifice 50. The roll-over control means includes the vapor control chamber 110, the passageway 116, the ball 62, the control spring 64, and the venting control valve 96. Briefly, to overcome the force exerted on the pressure relief valve 78 through the orifice 50, pressure is introduced into the venting control chamber 110 which corresponds to the pressure within the discharge orifice 50. However, because of the larger area defined by the dimension 112 within the venting control chamber 110, the pressure within the venting control chamber 112 exerts a greater force on the pressure relief valve 78 than the force exerted on the fuel tank side of the pressure relief valve 78. This results in the pressure relief valve being urged to remain in contact with the valve seat 86 to prevent any of the fuel 136 from leaking from the tank through the cap 10.

Specifically, with the cap 10 in a substantially inverted orientation such as shown in FIG. 3, the fluid head created by the fuel 136 and any vapor pressure exert a force on the ball 62 through the opening 70 which, combined with the weight of the ball 62, overcomes the biasing force of the spring 64 and moves the ball 62 away from the opening 70. This permits the fuel 136 to enter the cavity 70, and to travel to the venting control chamber 110 via the passageway 116. Thus, pressure created by the fuel 136 and any vapor pressure within the tank is then established within the venting control chamber 110. It will be understood that this pressure corresponds to the pressure existing within the discharge orifice 50. Therefore, the pressures exerted on both sides of the pressure relief valve 78 are substantially identical. However, due to the increased surface area defined by the dimension 112 with respect to the dimension 52, the force exerted from within the venting control chamber 110 to urge the pressure relief valve 78 onto the valve seat 86 combined with the biasing force of the spring 112 is greater than the opposite force created within the discharge orifice 50. This results in the pressure relief valve 78 remaining seated on the valve seat 86.

A limited amount of fuel vapor is permitted to escape through the orifice 120 and outwardly to the atmosphere. However, the fuel 136 is prevented from escaping through the orifice 120 due to the action of the discriminating membrane 122. Thus, although a pressure greater than the first, predetermined superatmospheric pressure is exerted on the pressure relief valve 78 through the discharge orifice 50, the pressure relief valve 78 is urged to a sealing position with the valve seat 86 by the action of the venting control chamber 110. This advantageously prevents any substantial fuel leakage from the cap 10 under these conditions. It will be understood that, under these conditions, the spring 118 which controls the movement of the venting control valve 96, is selected to have sufficient strength to retain the venting control valve 96 in sealing engagement with the shoulder 98 and gasket 100 to maintain the integrity of the venting control chamber 110.

Figure 4:
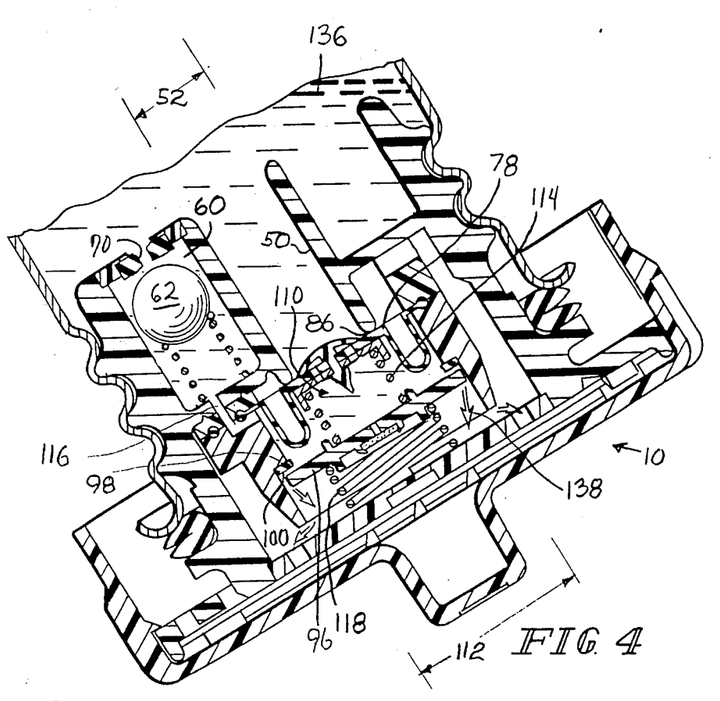
FIG. 4 is a view similar to FIG. 2 with the fuel and fuel vapor exceeding the predetermined maximum pressure within the venting control chamber to move the safety valve or chamber control plate away from its seat to permit the fuel and fuel vapor to dissipate from the venting control chamber.

FIG. 4 illustrates the configuration of the cap 10 should a higher pressure than would normally exist in a roll-over situation occur within the fuel tank (not shown). Such a higher pressure, that is higher than the second, predetermined superatmospheric pressure present in the configuration illustrated in FIG. 3, might occur should the fuel tank be somehow damaged during the roll-over accident, or should a fire or other occurrence exist which increases the pressure within the fuel tank. It will be understood that under such circumstances, it may be desirable to permit controlled fuel leakage from the cap 10 in order to relieve this excess pressure within the fuel tank. Such excess pressure, if allowed to remain in the tank, may result in fuel tank rupture. Thus, under these conditions, it may be advantageous to permit controlled fuel leakage as opposed to accepting the possibility of fuel tank rupture.

To accomplish this controlled fuel leakage from the cap 10 under these circumstances, the venting control valve 96 and spring 118 are configured to cooperate to define dissipation means to partially open the venting control chamber 110 when the pressure due to the combined actions of liquid head pressure and vapor pressure and other mechanical pressures are present within the venting control chamber 110. Specifically, the spring 118 is selected to permit the venting control valve 96 to move away from the shoulder 98 and gasket 100 when the pressure within the venting control chamber 110 reaches a third predetermined superatmospheric level higher than the second, predetermined superatmospheric level. When the venting control valve 96 moves away from the shoulder 98 and gasket 100, pressure within the venting control chamber 110 is permitted to escape as indicated by the arrows 138. Again, as in the configuration illustrated in FIG. 3, this Pressure has been transmitted to the venting control chamber 110 through the cavity 60 and passageway 116 due to the fact that the ball 62 is urged away from the opening 70.

As the pressure within the venting control chamber 110 decreases due to the outflow as indicated by the arrows 138, it will be understood that the force exerted on the pressure relief valve 78 from within the venting control chamber 110 also decreases. However, it will be further understood that the force exerted on the fuel tank side of the pressure relief valve 78 through the discharge orifice 50 does not decrease in like manner. Thus, as the pressure, and thus the force from within the venting control chamber 110 continues to decrease, at a certain point the force exerted on the pressure relief valve 78 through the discharge orifice 50 will meet and exceed the force exerted on the pressure relief valve 78 from the venting control chamber 110. In addition to this change in relative forces exerted on the pressure relief valve 78, the biasing force exerted on the pressure relief valve 78 by the spring 114 has also been decreased somewhat due to the movement axially of the venting control valve 96. As discussed previously, the venting control valve 96 acts as a support for the spring 114. Thus, due to the decreased biasing force of the spring 114, and the reversal of the opposing forces exerted on the pressure relief valve 78, a condition is reached at which the pressure relief valve 78 is urged away from the valve seat 86. This condition is illustrated in FIG. 5.

Figures 5, 6:
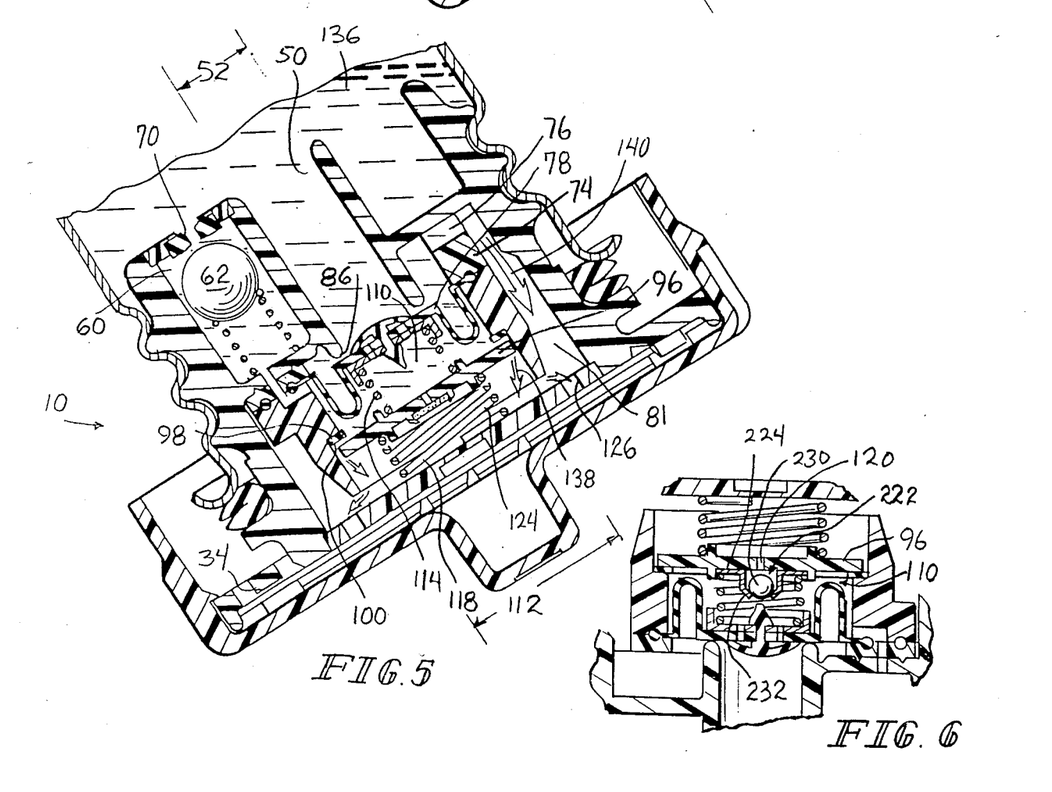
FIG. 5 is a view similar to FIG. 3 with a portion of the fuel and fuel vapor dissipated from the venting control chamber and illustrating the movement of the pressure control valve toward its venting position.
FIG. 6 is an isolated partial sectional view showing a modification of the fuel cap of the present invention.

Referring to FIG. 5, FIG. 5 illustrates the resulting orientation of the pressure relief valve 78 when the force exerted on the fuel tank side of the pressure relief valve 78 exceeds the force exerted on the pressure relief valve 78 from the venting control chamber 110 due to a dissipation of the pressure within the venting control chamber 110. As stated previously, this dissipation of pressure within the venting control chamber 110 has resulted from the movement of the venting control valve 96 away from the shoulder 98 and gasket 100 to permit an outflow of fuel and pressure as indicated by the arrows 138. Again, this condition only occurs when the combined pressure due to fuel head pressure and other pressure within the tank have reached the third superatmospheric level, a point at which rupture of the fuel tank is a possibility.

Because of the dissipation of pressure from the venting control chamber 110, the pressure relief valve 78 has moved away from the valve seat 86. This permits fuel 136 to flow in a controlled manner through the opening 76 in the diaphragm seat member 74 and outwardly through the outer space 81 and holes 126 and openings 34 to leak to the atmosphere. This controlled outflow of fuel 136 is indicated by the arrows 140. By permitting a controlled outflow of fuel 136 from the fuel tank through the above-described route, the excessive pressure within the fuel tank is enabled to decrease in a controlled fashion until the pressure reaches the second predetermined superatmospheric level. This advantageously reduces the chances of rupture of the fuel tank.

When the pressure within the fuel tank decreases to the second superatmospheric level, the opposing forces on the pressure relief valve 78 will again reverse which will return the pressure relief valve 78 to its position in contact with the valve seat 86. This configuration is illustrated in FIG. 3, and, as described previously, is the desired configuration of the cap 10 in a normal roll-over condition where the pressure within the fuel tank does not create the possibility of fuel tank rupture.

As described, the transition from the configuration illustrated in FIG. 3 to the configuration illustrated in FIGS. 4 and 5 can take place a number of times if the pressure within the fuel tank continues to increase over a period of time. Thus, the cap 10 is configured to compensate for any increased pressure that may occur within the fuel tank during a roll-over condition. If the pressure increases to a potentially dangerous level, the cap 10 will permit a controlled leakage of fuel 136 from the cap 10 to reduce the pressure level within the fuel tank. As the pressure reduces to an acceptable level, the cap 10 will eliminate the controlled outflow or leakage of fuel 136 as illustrated in FIG. 3.

Thus, the fuel cap 10 of the present invention is able to provide controlled vapor release of fuel vapor from the cap 10 under normal conditions. In addition, the fuel cap 10 provides enhanced vacuum equalization should a vacuum exist within the tank when the cap 10 is in a normal orientation. By utilizing the pressure relief valve 78 as a vacuum equalization valve, a vacuum existing within the tank is expeditiously equalized. Also, the cap 10 provides for roll-over protection should the vehicle and fuel cap 10 be rolled over to a substantially inverted orientation. Should the roll-over condition be somewhat normal such that no excessive pressure is present within the fuel tank, the cap 10 prevents any fuel leakage through the cap 10. However, should an excessive pressure exist within the fuel tank during the roll-over condition, the cap 10 advantageously provides for controlled fuel leakage to reduce the excessive pressure to an acceptable level. This reduces the possibility of fuel tank rupture under these unusual circumstances.

FIG. 6 shows a modification of the present invention in which the discriminating membrane 122 has been replaced by a ball assembly 222 to control flow through the orifice 120. Specifically, the discriminating membrane 122 has been eliminated from the upper surface of the venting control valve 96 and has been replaced by a ball assembly 222 that is disposed below the venting control plate 96. The ball assembly 222 includes a ball cage 224 that is mounted on the underneath side of the venting control valve 96. The ball cage 224 is configured to receive a sealing ball 230 that is configured to permit fluid communication through the orifice 120 to the venting control chamber 110 when the cap 10 is in the normal, upright orientation as illustrated in FIG. 6.

To permit this fluid communication between the atmosphere and the venting control chamber 110 in this orientation, the ball cage 224 may be formed from a series of axially downwardly extending fingers 232, or any other suitable configuration that would permit fluid communication between the orifice 120 and the interior of the venting control chamber 110 when the ball 230 is in the configuration illustrated in FIG. 6. When the fuel cap 10 is rolled over to a substantially inverted orientation as illustrated in FIGS. 3-5, it will be understood that the ball 230 will seat against the orifice 120 to seal the orifice 120 to prevent any fuel 136 (not shown) from leaking through the orifice 120 and out of the cap 10. It will be understood that with the ball 230 sealed against the orifice 120, no vapor will be permitted to flow through the orifice 120 as was permitted through the discriminating element 122 in the embodiment and configuration illustrated in FIG. 3. All other aspects of the embodiment illustrated in FIG. 6 are identical to those illustrated in FIGS. 1-5.

Although the invention has been described in detail with reference to a certain preferred embodiment, variations and modifications exist within the scope and spirit of the invention as described and defined in the following claims.

What is claimed is:

1. A fuel cap for use in a vehicle fuel system filler neck, the cap comprising
closure means for closing the filler neck,
pressure relief means for venting pressurized fuel vapor in the filler neck through the closure means, and
roll-over control means for controllably disabling the pressure relief means during vehicle rollover or the like to block discharge of liquid fuel in the filler neck to the atmosphere through the pressure relief means, the closure means being formed to include conducting means for conducting liquid fuel and fuel vapor from the filler neck to the atmosphere, the pressure relief means being situated in an upstream position in the conducting means, and the roll-over control means being situated to intersect the conducting means in a position in downstream relation to the pressure relief means.

2. A fuel cap for use in a vehicle fuel system filler neck, the cap comprising
closure means for closing the filler neck,
pressure relief means for venting pressurized fuel vapor in the filler neck through the closure means, and
roll-over control means for controllably disabling the pressure relief means during vehicle rollover or the like to block discharge of liquid fuel in the filler neck to the atmosphere through the pressure relief means, the closure means including an inner surface defining a venting aperture and providing a first valve seat surrounding the venting aperture, the pressure relief means including a pressure relief valve and spring means for yieldably biasing the pressure relief valve against the first valve seat normally to close the venting aperture, and the roll-over control means including passageway means for establishing fluid communication of liquid fuel and fuel vapor in the filler neck with the pressure relief valve so that said liquid fuel and fuel vapor cooperate with the spring means to exert a closure-inducing force on the pressure relief valve.

3. The cap of claim 2, wherein the roll-over control means further includes roll-over valve means for normally blocking the flow of liquid fuel and fuel vapor into the passageway means from the filler neck to permit generally unencumbered operation of the pressure relief valve.

4. The cap of claim 2, wherein the passageway means, the pressure-relief valve, and the roll-over valve means cooperate to define a vacuum chamber, the pressure relief valve is formed to include at least one fluid-conducting passageway interconnecting the vacuum chamber and the filler neck, and includes a first portion communicating with the vacuum chamber, a second portion communicating with the atmosphere for normally contacting the first valve seat, and vacuum relief means for unblocking the at least one fluid-conducting passageway in response to suction caused by sub-atmospheric pressure in the filler neck to draw air from the vacuum chamber into the filler neck, thereby evacuating the vacuum chamber to lower the pressure therein so that atmospheric forces exerted on the second portion operate to move the pressure relief valve away from the first valve seat to permit atmospheric air to be drawn into the filler neck by said suction.

5. The cap of claim 2, wherein the passageway means includes an end surface defining an inlet aperture and providing a second valve seat surrounding the inlet aperture and the roll-over valve means includes a valve member and second spring means for yieldably biasing the valve member against the second valve seat so that the valve member is biased to close the inlet aperture until pressure provided by liquid fuel and fuel vapor at the inlet aperture exceeds a predetermined threshold pressure sufficient to move the biased valve member to an inlet aperture-opening position.

6. The cap of claim 2, wherein the roll-over control means further includes safety valve means for exhausting liquid fuel and fuel vapor from the passageway means to the atmosphere whenever the pressure of liquid fuel and fuel vapor in the passageway means exceeds a predetermined maximum pressure so that any closure-inducing force exerted on the pressure relief valve by the spring means in cooperation with liquid fuel and fuel vapor in the passageway means is less than any opening-inducing pressure exerted on the pressure relief valve by liquid fuel and fuel vapor at the venting aperture to permit the pressure relief valve to move toward a venting aperture-opening position.

7. The cap of claim 6, wherein the passageway means is formed to include an outlet aperture and an outlet valve seat surrounding the outlet aperture and the safety valve means includes a venting control valve and second spring means for yieldably biasing the venting control valve against the outlet valve seat normally to close the outlet aperture until the pressure of liquid fuel and fuel vapor in the passageway means exceeds the predetermined maximum pressure.

8. The cap of claim 7, wherein the venting control valve is situated in communication with both of the first and second spring means.

9. The cap of claim 7, wherein the safety valve means includes a venting control valve movable between a liquid fuel and fuel vapor-retaining position and a liquid fuel and fuel vapor-exhausting position and pressure-sensing means for permitting movement of the venting control valve toward its liquid fuel and fuel vapor-exhausting position in response to movement-inducing forces generated by pressure in excess of the predetermined maximum pressure extant in the passageway means.

10. A fuel cap for use in a vehicle fuel system filler neck, the cap comprising
closure means for closing the filler neck,
pressure relief means for venting pressurized fuel vapor in the filler neck through the closure means,
roll-over control means for controllably disabling the pressure relief means during vehicle rollover or the like to block discharge of liquid fuel in the filler neck to the atmosphere through the pressure relief means, and
override means for disabling the roll-over control means in response to a pressure in excess of a predetermined maximum pressure of the liquid fuel and fuel vapor in the filler neck.

11. A fuel cap for use in a vehicle fuel system filler neck, the cap comprising
closure means for closing the filler neck,
pressure relief means for venting pressurized fuel vapor in the filler neck through the closure means, the pressure relief means including a pressure relief valve movable between filler neck-venting and non-venting positions, and
roll-over control means for selectively using liquid fuel and fuel vapor in the filler neck to exert a closing force on the pressure relief valve so that the pressure relief valve is moved to its non-venting position, thereby blocking discharge of liquid fuel in the filler neck to the atmosphere through the pressure relief means during vehicle rollover or the like.

12. The cap of claim 11, wherein the roll-over control means cooperates with the pressure relief valve to define venting control chamber means for containing liquid fuel and fuel vapor in a predetermined region permitting liquid fuel and fuel vapor to exert said closing force on the pressure relief valve.

13. The cap of claim 11, wherein the venting control chamber means is formed to include inlet means for admitting ambient air or the like into the venting control chamber means, the pressure relief valve is formed to include at least one fluid-conducting passageway interconnecting the venting control chamber means and the filler neck and includes vacuum relief means for unblocking the at least one fluid-conducting passageway in response to suction caused by sub-atmospheric pressure in the filler neck to draw ambient air into the venting control chamber means via the inlet means and into the filler neck via the at least one fluid-conducting passageway, and the at least one fluid-conducting passageway is sized relative to the inlet means to deplete the supply of ambient air in the venting control chamber means gradually during operation of the vacuum relief means, thereby lowering the pressure in the venting control chamber means to a sub-atmospheric pressure to provide means for inducing movement of the pressure relief valve toward its filler neck-venting position so that ambient air is drawn into the filler neck via the pressure relief means in response to said suction in addition to the ambient air introduced into the filler neck via the vacuum relief means.

14. The cap of claim 13, wherein the inlet means includes discriminator means for blocking discharge of liquid fuel from the venting control chamber means without impeding flow of ambient air, fuel vapor, and the like through the inlet means.

15. The cap of claim 12, wherein the roll-over control means further includes passageway means for establishing communication of liquid fuel and fuel vapor in the filler neck with the venting control chamber means and valve means in the passageway means for blocking flow of liquid fuel and fuel vapor through the passageway means until the force exerted by the liquid fuel and fuel vapor in the filler neck upon the valve means exceeds a predetermined threshold force during vehicle rollover or the like.

16. The cap of claim 12, wherein the venting control chamber means includes safety valve means for exhausting liquid fuel and fuel vapor in excess of a predetermined maximum pressure from said predetermined region to the atmosphere so that liquid fuel and fuel vapor in said predetermined region dissipates to lower the pressure in the predetermined region to a magnitude less than a minimum pressure magnitude, thereby permitting the pressure relief valve to move to its venting position.

17. The cap of claim 16, wherein the venting control chamber includes an inner surface defining an outlet aperture for discharging liquid fuel and fuel vapor from the predetermined region and providing a valve seat surrounding the outlet aperture and the safety valve means includes a venting control valve movable between outlet aperture-closing and outlet aperture-opening positions and spring means for yieldably biasing the venting control valve against the valve seat normally to close the outlet aperture, the spring means being configured to yield upon exposure of the venting control valve to liquid fuel and fuel vapor having a pressure in excess of said predetermined maximum pressure to permit movement of the venting control valve toward an outlet aperture-opening position.

18. A fuel cap for use in a vehicle fuel system filler neck, the cap comprising
closure means for closing the filler neck,
pressure relief means for venting pressurized fuel vapor in the filler neck through the closure means, the pressure relief means including a pressure relief valve exposed to liquid fuel and fuel vapor in the filler neck and movable between filler neck-venting and non-venting positions, and
roll-over control means for selectively maintaining the pressure relief valve in its non-venting position to prevent discharge of liquid fuel in the filler neck to the atmosphere through the pressure relief means, the roll-over control means including sensing means movably coupled to the closure means for sensing inversion of the filler neck during vehicle rollover and equalization means responsive to the sensing means for creating a valve movement-controlling force during vehicle rollover, the equalization means being configured to apply the valve movement-controlling force to the pressure relief valve to position the pressure relief valve in its non-venting position 19. The cap of claim 18, wherein the roll-over control means further includes dissipation means for dissipating the valve movement-controlling force in response to pressure in the filler neck in excess of a maximum predetermined pressure.

20. The cap of claim 19, wherein the dissipation means includes a venting control valve movable between venting and non-venting positions and spring means for yieldably biasing the venting control valve toward its non-venting position, the spring means being configured to position the venting control valve in its non-venting position only while the pressure in the filler neck is less than said maximum predetermined pressure.

21. A fuel cap for use in a vehicle fuel system filler neck, the cap comprising
   closure means for closing the filler neck,
   pressure relief means for venting pressurized fuel vapor in the filler neck through the closure means, and
   roll-over control means for creating a region within the closure means in communication with the pressure relief means to receive liquid fuel and fuel vapor from the filler neck during vehicle rollover or the like to disable the pressure relief means so that discharge of liquid fuel in the filler neck through the pressure relief means to the atmosphere is blocked.

22. A fuel cap for use in a fuel system filler neck, the cap comprising
   closure means for closing the fill neck,
   pressure relief means for venting pressurized fuel vapor in the filler neck through the closure means, the pressure relief means including a valve seat and a companion pressure relief valve movable to mate with the valve seat, the pressure relief valve cooperating with the closure means to define a suction chamber and being formed to include at least one fluid-conducting passageway interconnecting the vacuum chamber and the filler neck, and
   vacuum relief means on the pressure relief valve for unblocking the at least one fluid-conducting passageway in response to suction caused by sub-atmospheric pressure in the filler neck to draw air extant in the suction chamber into the filler neck via the at least one fluid-conducting passageway, thereby lowering the pressure in the suction chamber to decrease any closure-inducing force exerted on the pressure relief valve by pressure in the suction chamber so that atmospheric forces exerted on the pressure relief valve operate to move the pressure relief valve away from its valve seat to permit atmospheric air to be drawn into the filler neck by sub-atmospheric pressure in the filler neck.

23. A vacuum valve for regulating introduction of atmospheric air into tank means, the vacuum valve comprising
   chamber means for containing air,
   primary valve means responsive to suction caused by sub-atmospheric pressure in the tank means for communicating air extant in the chamber means with the tank means to lower pressure in the chamber means, and
   auxiliary valve means responsive to a predetermined decrease in pressure in the chamber means for communicating atmospheric air with the tank means.

24. The vacuum valve of claim 22, wherein the auxiliary valve means includes pressure relief means for venting pressurized vapor in the tank means.

25. The vacuum valve of claim 22, wherein the auxiliary valve means includes a valve member formed to include at least one fluid-conducting passageway interconnecting the chamber means and the tank means and the primary valve means includes an openable umbrella valve coupled to the valve member and situated normally to block the at least one fluid-conducting passageway, the umbrella valve is positioned in communication with the tank means and the valve member includes a first portion communicating with the atmosphere and a second portion communicating with the chamber means.

* * * * *